(12) United States Patent
Futch et al.

(10) Patent No.: US 12,734,950 B2
(45) **Date of Patent: *Sep. 15, 2026**

(54) TRAY, BELT, OR CARRIER ON COMPUTER CONTROLLED TRANSPORT VEHICLE

(71) Applicant: Tompkins Robotics, Inc., Orlando, FL (US)

(72) Inventors: Michael C. Futch, Cocoa, FL (US); James M. Serstad, Orlando, FL (US)

(73) Assignee: TOMPKINS ROBOTICS, INC., Orlando, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/246,842

(22) Filed: Jun. 24, 2025

(65) Prior Publication Data

US 2025/0313141 A1 Oct. 9, 2025

Related U.S. Application Data

(63) Continuation of application No. 17/323,595, filed on May 18, 2021, now Pat. No. 12,351,092, which is a (Continued)

(51) Int. Cl.
*B60P 1/38* (2006.01)
*B60P 1/04* (2006.01)
*B60P 3/00* (2006.01)

(52) U.S. Cl.
CPC .................. *B60P 1/38* (2013.01); *B60P 1/04* (2013.01); *B60P 3/007* (2013.01)

(58) Field of Classification Search
CPC .................................... B60P 1/04; B60P 1/38
See application file for complete search history.

(56) References Cited

U.S. PATENT DOCUMENTS 9,020,632 B2 4/2015 Naylor
10,292,334 B2 5/2019 Scremin et al.
(Continued)

FOREIGN PATENT DOCUMENTS

JP 2009298223 A 12/2009
KR 20100070799 A 6/2010
(Continued)

OTHER PUBLICATIONS

ISA/KR; International Search Report and Written Opinion for International Patent Application PCT/US2019/050191 dated Jan. 16, 2020, 10 pages.

(Continued)

*Primary Examiner* — Jonathan Snelting
(74) *Attorney, Agent, or Firm* — Parthiban A Mathavan

(57) ABSTRACT

Method of transporting an article with a computer controlled transport vehicle to a destination includes transporting an article carried by a computer controlled transport vehicle to a destination, wherein a tray, belt, or carrier attached to the computer controlled transport vehicle engages the article. The method further includes determining a characteristic for the article. The method furthermore includes manipulating the tray, belt, or carrier from a first position to a second position to deposit the article at the destination, wherein the manipulation of the tray, belt, or carrier is adjusted based on the characteristic determined for the article to adjust a deposit characteristic of the article.

18 Claims, 3 Drawing Sheets

Related U.S. Application Data continuation of application No. PCT/US2019/050191, filed on Sep. 9, 2019.

(60) Provisional application No. 62/792,111, filed on Jan. 14, 2019, provisional application No. 62/771,621, filed on Nov. 27, 2018.

(56) References Cited

U.S. PATENT DOCUMENTS

| | | | | |
|---|---|---|---|---|
| 10,894,664 | B1 | 1/2021 | Brady et al. | |
| 11,208,023 | B2 | 12/2021 | Marble | |
| 2011/0229292 | A1* | 9/2011 | Applewhite | B65F 1/1452<br>414/404 |
| 2015/0122611 | A1 | 5/2015 | Lykkegaard et al. | |
| 2016/0132059 | A1 | 5/2016 | Mason et al. | |
| 2019/0121022 | A1 | 4/2019 | Ellis-Monaghan et al. | |
| 2021/0268951 | A1 | 9/2021 | Futch et al. | |

FOREIGN PATENT DOCUMENTS

| | | | |
|---|---|---|---|
| KR | 20170047844 | A | 5/2017 |
| WO | 2020112201 | A1 | 6/2020 |

OTHER PUBLICATIONS

WIPO; International Preliminary Report on Patentability for International Patent Application No. PCT/US19/50191 dated Jun. 10, 2021, 7pages.

* cited by examiner

TRAY, BELT, OR CARRIER ON COMPUTER CONTROLLED TRANSPORT VEHICLE

CROSS-REFERENCE TO RELATED APPLICATIONS

This application is a continuation of International Application No. PCT/US2019/050191 filed Sep. 9, 2019, which claims priority to U.S. Provisional Patent Application No. 62/792,111 filed on Jan. 14, 2019, and to U.S. Provisional Patent Application No. 62/771,621 filed on Nov. 27, 2018, the entire contents of which are incorporated by reference herein.

TECHNICAL FIELD

The present invention relates to a material handling system, and in particular to a computer-controlled transport vehicle for transporting sorted articles to specified receptacles.

BACKGROUND

Sorting and retrieving articles to fill customer orders such as an ecommerce order requires care, especially when it comes to fragile articles. In many order fulfillment centers, automated picking is utilized to reduce labor cost and to improve customer service by reducing the cost and time associated with filling each customer order. In material handling systems and conveyance systems such as conveyor systems and sorter systems, articles are generally transferred to or from a conveyor, or from one conveyor to another conveyor, for example, from a feed conveyor to a receiving conveyor as part of the sorting process. In some conveyance systems, a conveyor can form part of a movable vehicle used to transport articles to, or retrieve the articles from, a location associated with an order fulfillment center. In typical conveyance systems, how the article is moved or transported through the conveyance system is typically the same for all articles-irrespective of the physical characteristics of each article, including its fragility. For example, conveyance systems including a tilt-tray, cross belt, bomb bay, slide tray, slat shoe, narrow belt, AGV, and similar other conveyance systems operate to move all articles traversing at the same speed and apply the same method of movement-irrespective of the specific physical characteristics of the article being moved. For example, when the physical characteristics of an article are incompatible with the movement characteristics of a conveyance system, employing the incompatible conveyance system to convey such an article can result in inadvertent damage to the article being sorted. This limits the ability of existing conveyance systems to transport, move, or sort a wide range of articles that can be associated with customer orders.

Conveyance systems in the market divert an article from the tilt-tray, cross belt, bomb bay, slide tray, slat shoe, narrow belt, AGV, or similar other conveyance system while the article is in motion whereby a moving divert is required because these conveyance systems include a fixed track and all articles to be diverted move along the same track at the same speed. This too can contribute to potential damage to fragile articles during the sorting process.

Furthermore, existing conveyance systems typically divert or drop articles being sorted into a tote or a chute. The impact that a fragile article makes with the bottom of the tote or chute can damage the article. Adding cushioning to the tote or chute may not solve the problem because the impact of one fragile article on another article that is already present in the receiving destination or collection device (e.g., a receiving tote) may result in damage even with cushioning. For example, two glass candle jars that need to be sorted to the same order may result in damage to one or both of the glass candle jars. While the first jar may have been diverted without damage, the second jar may itself be damaged or it may damage the first jar due to the glass-on-glass impact when the second jar is diverted to the same tote or chute. This too may contribute to potential damage to fragile articles during the sorting process.

A need exists for sorting articles, especially fragile articles, in a manner that results in minimal to no damage occurring to the fragile articles during the material handling, conveyance or sorting processes.

SUMMARY

This summary is provided to introduce in a simplified form concepts that are further described in the following detailed descriptions. This summary is not intended to identify key features or essential features of the claimed subject matter, nor is it to be construed as limiting the scope of the claimed subject matter.

Disclosed herein is a control system configured for use with transporting an article with a computer controlled transport vehicle to a destination. In various embodiments, the control system comprises a memory and a processor. The control system is configured to transport an article carried by the computer controlled transport vehicle to the destination, wherein a tray, belt, or carrier attached to the computer controlled transport vehicle engages the article, wherein a characteristic is determined for the article. The control system is further configured to manipulate the tray, belt, or carrier from a first position to a second position to deposit the article at the destination, wherein the manipulation of the tray, belt, or carrier is adjusted based on the determined characteristic to adjust a deposit characteristic of the article.

According to one or more embodiments, the deposit characteristic comprises one or more of a deposit speed, a deposit acceleration, a deposit angle, a deposit period, and a deposit movement.

According to one or more embodiments, the manipulation of the tray from the first position to the second position causes the article to slide across a tray surface and deposit at the destination.

According to one or more embodiments, the manipulation of the belt from the first position to the second position causes the article to traverse the belt and deposit at the destination.

According to one or more embodiments, the manipulation of the carrier from the first position to the second position causes the article to move away from the computer controlled transport vehicle and deposit at the destination.

According to one or more embodiments, the manipulation of the tray, belt, or carrier from the first position to the second position occurs over a specific span of time, wherein the specific span of time is based on the characteristic determined for the article.

According to one or more embodiments, the destination is a chute, wherein the manipulation of the tray, belt, or carrier from the first position to the second position causes the article to slide into or onto an article-traversing surface of the chute.

According to one or more embodiments, the destination is a receptacle, wherein the manipulation of the tray, belt, or carrier from the first position to the second position causes the article to deposit at the receptacle.

According to one or more embodiments, the receptacle is a tote, a carton, a bag or a Gaylord liner.

According to one or more embodiments, the control system is further configured to adjust an acceleration of a speed of the manipulation of the tray, belt, or carrier from the first position to the second position to cause the article to slide across a tray surface, traverse a belt, or move away from the computer controlled transport vehicle, and deposit at the destination.

According to one or more embodiments, the control system is further configured to adjust a deceleration of a speed of the manipulation of the tray, belt, or carrier from the first position to the second position to cause the article to slide across a tray surface, traverse a belt, or move away from the computer controlled transport vehicle, and deposit at the destination.

According to one or more embodiments, the deposit characteristic is the deposit angle, wherein the deposit angle is configured to overcome a force of static electricity between the article and a tray surface.

According to one or more embodiments, the destination is a receptacle or chute, wherein the system is further configured to direct the computer controlled transport vehicle to come to a complete stop prior to the manipulation of the tray, belt, or carrier to facilitate a positive deposition of the article at the receptacle or chute.

According to one or more embodiments, the system is further configured to receive the article from an article supply location at a warehouse.

According to one or more embodiments, the system is further configured to transport the article from an article supply location to a receptacle or chute location.

According to one or more embodiments, the tray includes a tilting divert mechanism, wherein the system is further configured to manipulate the tray from the first position to the second position such that an edge of the tray traverses a parabolic path during the manipulation of the tray.

According to one or more embodiments, the system is further configured to set a first deposit angle for a first article, and set a second deposit angle different from the first deposit angle for a second article.

According to one or more embodiments, the system is further configured to manipulate the tray, belt, or carrier from the first position to a third position different from the second position to deposit a second article at the destination, wherein the manipulation of the tray, belt, or carrier from the first position to the third position is adjusted based on a determined characteristic for the second article.

According to one or more embodiments, the system is further configured to adjust a diverting attribute of a diverting arm to deposit the article at the destination, the diverting attribute based on the characteristic determined for the article.

According to one or more embodiments, the diverting attribute comprises one or more of a diverting speed, a diverting acceleration, a diverting angle, a diverting period, and a diverting movement.

According to one or more embodiments, the system is further configured to adjust a pushing attribute of a pushing device to deposit the article at the destination, the pushing attribute based on the characteristic determined for the article.

According to one or more embodiments, the pushing attribute comprises one or more of a pushing speed, a pushing acceleration, a pushing angle, a pushing period, and a pushing movement.

According to one or more embodiments, the control system further comprises one or more of a scale, a dimensioning device or a vision device configured to interact with the article to identify one or more physical characteristics of the article.

According to one or more embodiments, the tray includes a tilting divert mechanism, wherein the system is further configured to determine one or more tray operating parameters such as a tilt speed, a tilt acceleration, a tilt angle, and an acceleration of tilt to be applied when manipulating the tray from the first position to the second position to deposit the article at the destination, wherein the one or more tray operating parameters is determined based on the one or more physical characteristics of the article.

According to one or more embodiments, the belt includes a rotating belt divert mechanism, wherein the system is further configured to determine one or more belt operating parameters such as a belt speed, a belt acceleration, and a belt rotation distance to be applied when manipulating the belt from the first position to the second position to deposit the article at the destination, wherein the one or more belt operating parameters is determined based on the one or more physical characteristics of the article.

According to one or more embodiments, the deposit characteristic is the deposit movement, wherein the system is further configured to determine one or more deposit movement parameters such as a movement speed, a movement acceleration, and a movement distance to be applied when manipulating the device from the first position to the second position to deposit the article at the destination, wherein the one or more deposit movement parameters is determined based on the one or more physical characteristics of the article.

According to one or more embodiments, two or more trays attached to the computer controlled transport vehicle engage the article, wherein the manipulation of a first tray is different from the manipulation of a second tray.

According to one or more embodiments, two or more belts attached to the computer controlled transport vehicle engage the article, wherein the manipulation of a first belt is different from the manipulation of a second belt.

According to one or more embodiments, two or more carriers attached to the computer controlled transport vehicle engage the article, wherein the manipulation of a first carrier is different from the manipulation of a second carrier.

According to one or more embodiments, deposit characteristic of the article is supplied by a cross-reference table, wherein the cross-reference table includes a list of deposit characteristics for a plurality of articles.

Disclosed herein is a system comprising an article supply location, the article supply location including a plurality of articles. The system also includes a computer controlled transport vehicle including a tray, belt, or carrier having a first position in which an article is stowed about the tray, belt, or carrier and a second position in which the article is deposited into a proximal destination. The system further includes an information acquisition device configured to interact with an identifier associated with a selected article of the article supply location. The system furthermore includes a control system configured to transport an article carried by the computer controlled transport vehicle proximal to the destination, wherein the tray, belt, or carrier engages the article, wherein a characteristic is determined for the article based on the identifier, and manipulate the tray, belt, or carrier from the first position to the second position to deposit the article at the destination, wherein the manipulation of the tray, belt, or carrier is adjusted based on the determined characteristic to adjust a deposit characteristic of the article.

Disclosed herein is a method for transporting an article with a computer controlled transport vehicle to a destination. The method comprises transporting an article carried by a computer controlled transport vehicle to a destination, wherein a tray, belt, or carrier attached to the computer controlled transport vehicle engages the article, wherein a characteristic is determined for the article, and manipulating the tray, belt, or carrier from a first position to a second position to deposit the article at the destination, wherein the manipulation of the tray, belt, or carrier is adjusted based on the determined characteristic to adjust a deposit characteristic of the article.

Disclosed herein is a control system configured for use with transporting an article with a computer controlled transport vehicle to a destination and depositing the article at the destination with a diverting arm. The control system includes a memory and a processor. The control system is configured to transport an article carried by the computer controlled transport vehicle to the destination, wherein a tray, belt, or carrier attached to the computer controlled transport vehicle engages the article, wherein a characteristic is determined for the article. The control system is further configured to manipulate the diverting arm from a first position to a second position to deposit the article at the destination, wherein the manipulation of the diverting arm is adjusted based on the determined characteristic to adjust a deposit characteristic of the article.

Disclosed herein is a control system configured for use with transporting an article with a computer controlled transport vehicle to a destination and depositing the article at the destination with a pushing device. The control system comprises a memory and a processor. The control system is configured to transport an article carried by the computer controlled transport vehicle to the destination, wherein a tray, belt, or carrier attached to the computer controlled transport vehicle engages the article, wherein a characteristic is determined for the article. The control system is further configured to manipulate the pushing device from a first position to a second position to deposit the article at the destination, wherein the manipulation of the pushing device is adjusted based on the determined characteristic to adjust a deposit characteristic of the article.

DETAILED DESCRIPTION OF THE EMBODIMENTS

Figure 1:
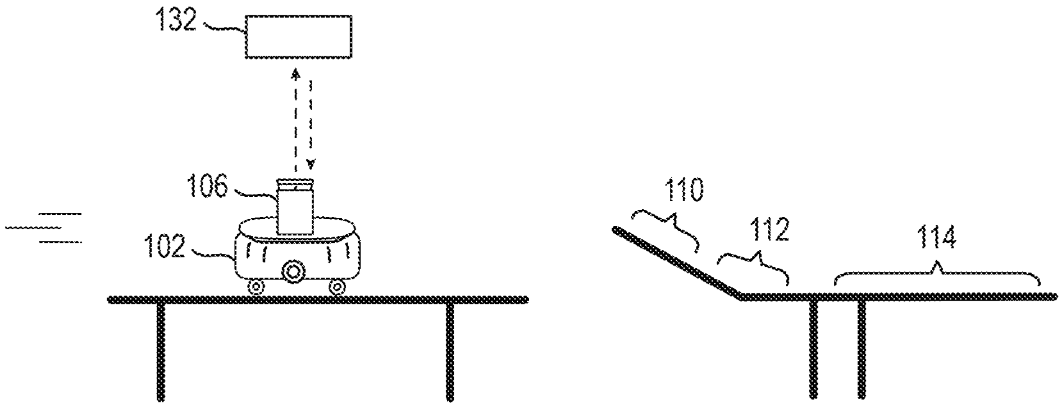
FIG. 1 is a schematic structural diagram of a computer controlled transport vehicle carrying an article to be sorted to a destination according one or more embodiments of the presently disclosed subject matter.

Below, the technical solutions in the examples of the present invention are depicted clearly and comprehensively with reference to the figures according to the examples of the present invention. Obviously, the examples depicted here are merely some examples, but not all examples of the present invention. In general, the components in the examples of the present invention depicted and shown in the figures herein can be arranged and designed according to different configurations. Thus, detailed description of the examples of the present invention provided in the figures below are not intended to limit the scope of the present invention as claimed, but merely represent selected examples of the present invention. On the basis of the examples of the present invention, all of other examples that could be obtained by a person skilled in the art without using inventive efforts will fall within the scope of protection of the present invention.

Embodiments of the presently disclosed subject matter can advantageously result in minimal to no damage occurring to fragile articles during the sorting process under various exemplary situations. Embodiments of the presently disclosed subject matter can advantageously provide effective sortation solution for a wide range of articles by providing optimized sortation that is customized for each specific article being sorted.

In various embodiments, the presently disclosed subject matter can advantageously sort an article and deliver the article to a receiving receptacle within a minimum possible time while simultaneously meeting one or more of the following criteria: (1) the article is maintained in a specific orientation while it undergoes sortation, (2) the article is subject to less than a specified maximum speed during the sortation process, and (3) the article is subject to less than a maximum specified acceleration, pitch, or sortation movement while the article is subjected to the sortation process.

Embodiments of the present invention can accordingly provide for safe sorting of articles that may be subjected to excessive speeds when diverted, articles that have especially high coefficients of friction due to static cling/electricity, condensation friction, or other types of friction that impedes effective movement, articles that have certain orientations that must be maintained such as shoe box that must stay in an upright orientation or the lids will fall off and the contents fall out of the box, or other situations where there is a need for control and stability of the movement or sort of the article in a controlled manner.

In some embodiments, the presently disclosed subject matter can advantageously sort a lightweight article by providing for additional specific movement, inertia, or other action for adequately diverting the article to the end destination such as a receiving receptacle.

In some embodiments, the presently disclosed subject matter can advantageously sort an article having a high coefficient of friction between itself and a surface on which it is placed due to causes such as static cling, static electricity, condensation, and similar other causes and thereby requires additional movement, inertia, or other action before the article is adequately diverted to the end destination such as a receiving receptacle.

In some embodiments, the presently disclosed subject matter can advantageously sort an article that must maintain a predetermined orientation so that it does not tumble, roll, fall open, spill its contents, or otherwise get negatively affected if certain sortation criteria such as speed, acceleration, sort angle, and similar other aspects are not maintained.

In some embodiments, the presently disclosed subject matter can advantageously sort an article that needs confirmed placement into a specified destination receptacle by eliminating the chance of the article being mis-diverted to a wrong end destination such as an adjacent location or adjacent receptacle.

Accordingly, embodiments of the present disclosed subject matter can advantageously provide for optimal sorting conditions for wide assortment of articles including those that are fragile or otherwise prone to damage/breaking, articles having minimal weight, articles with awkward shapes, articles with low density, and similar other articles.

Embodiments of the present disclosed subject matter can advantageously maintain ideal characteristics of the sortation movement and allow a sortation movement uniquely designed that is optimized for the sorted article's product characteristics to result in the optimal sortation effectiveness and delivery of the article to the end destination/receptacle in an optimal position, condition, and arrangement. Embodiments of the present disclosed subject matter can also allow for modification and customization, as needed, to accomplish such objectives.

The invention will now be described with reference to the FIGS. 1 to 6. The system as described herein can include a controller forming part of a control system communicating with one or more computer controlled transport vehicles such as vehicle 102 and other associated components. In the control system as described herein, as shown in the FIGS. 1 and 2, a computer controlled transport vehicle 102 traverses over a surface to a destination such as, for example, a receptacle or a chute, for depositing an article 106 that can be in the process of being sorted. In various embodiments, the control system comprises a memory and a processor. The control system operates to control transportation of article 106 carried by vehicle 102 to the destination, wherein a tray, belt, or carrier 104 attached to, and capable of, moving relative to the vehicle 102 engages the article 106. In one embodiment element 104 is a tray; in another embodiment, element 104 is a belt; in a further embodiment, it is a carrier or a similar other component. As used herein, a "carrier" can be any suitable mechanism attached to vehicle 102, or otherwise coupled to and forms an integral part of vehicle 102, which is capable of supporting the article 106 as it is transported by the vehicle 102 to the destination. The term "carrier" can further include any surface or means coupled to the transport vehicle and configured to carry an article to a destination, for example, as part of a sortation process. Hereinafter, in some instances, element 104 may be referred to herein as tray 104 for ease of description and for sake of simplicity. In some embodiments, the system further includes an information acquisition device 132 configured to interact with an identifier associated with article 106 transported by the vehicle 102 from the article supply location to a location proximal the receptacle or chute 108.

Figure 2:
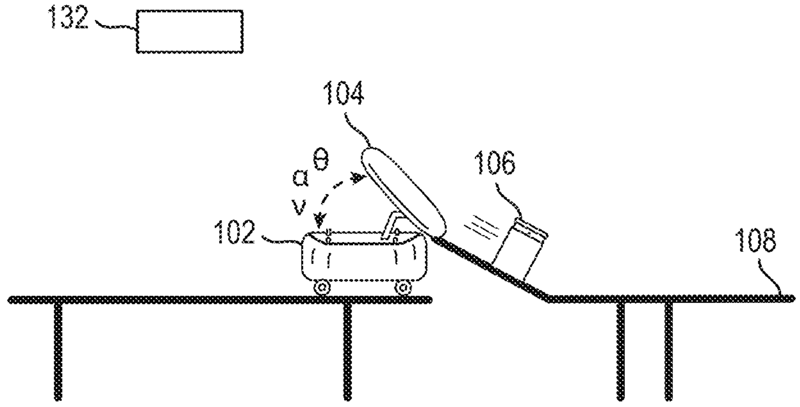
FIG. 2 is a schematic structural diagram of a computer controlled transport vehicle depositing the article to be sorted at a destination according one or more embodiments of the presently disclosed subject matter.

The system as described herein is further capable of determining one or more characteristics of article 106, and manipulating the tray, belt or carrier 104 from a first position (as shown in FIG. 1) to a second position (as shown in FIG. 2) to deposit the article 106 at the destination, the manipulation of the tray, belt or carrier 104 being adjusted based on the determined one or more characteristics to adjust a deposit speed, deposit acceleration, deposit angle, deposit period and deposit movement (collectively referred to as "deposit characteristics") of the tray, belt or carrier 104 to deposit the article. In FIG. 2, deposit speed is represented by "v", deposit acceleration is represented by "a", and deposit angle is represented by "θ". In one embodiment, vehicle 102 can include sensors on either end of the tray, belt or carrier 104 such that when article 106 starts to slip off the side at a time when it is not supposed to, tray, belt or carrier 104 is capable of automatically adjusting or otherwise engaging the article to retain the article back onto the tray, belt or carrier 104.

In one embodiment, the manipulation of the tray, belt or carrier 104 can be adjusted based on the determined characteristic to adjust a method of depositing the article using the tray, belt or carrier 104. The characteristic can be acquired by the control system or provided to the control system. In one embodiment, the destination can be a chute 108. In further embodiments, the destination can be receptacle such as a tote, carton, bag, a Gaylord liner, or any other similar receptacle configured for receiving and holding a plurality of articles being accumulated.

Figure 3:
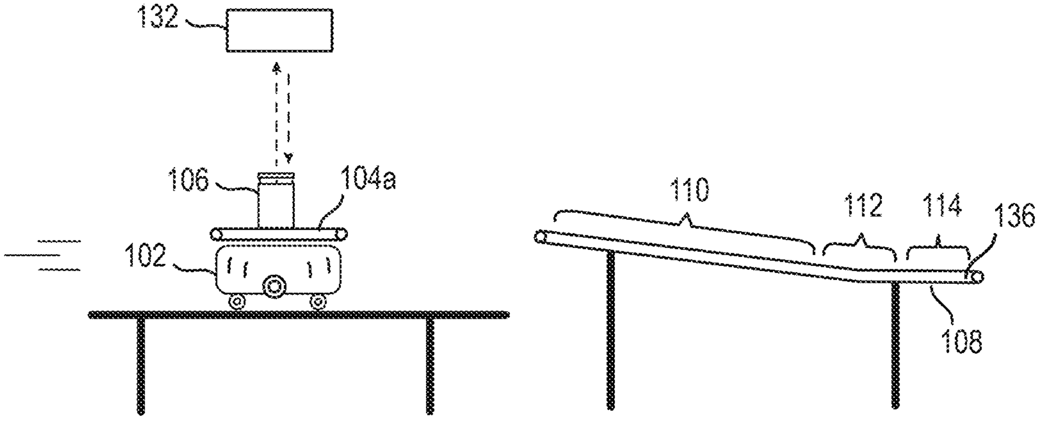
FIG. 3 is a schematic structural diagram of a computer controlled transport vehicle including a chute belt carrying an article to be sorted to a destination according one or more embodiments of the presently disclosed subject matter.
Figure 4:
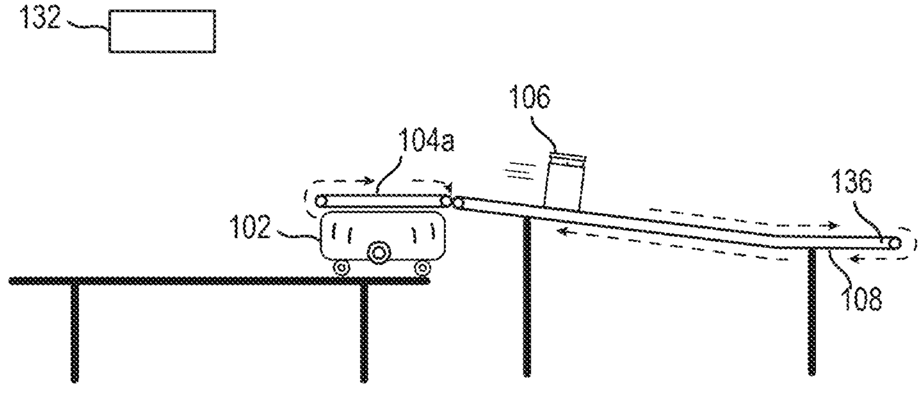
FIG. 4 is a schematic structural diagram of a computer controlled transport vehicle including a chute belt depositing the article to be sorted at a destination according one or more embodiments of the presently disclosed subject matter.

In one embodiment, element 104 is in the form of a belt **104*a* as illustrated in FIGS. 3 and 4. The belt 104*a* on the vehicle operates to deposit article 106 onto the chute. In one embodiment, the chute includes a chute belt 136. In one embodiment, chute belt 136 coupled to chute 108 can operate by gravity pulling the article down the decline; in another embodiment, chute belt 136 is powered. In case of a powered chute belt 136, the system as described herein can be capable of coordinating the speed of the belt 104*a* on vehicle 102 as well as the speed of the chute belt 136 on chute 108 such that both belts move at the same speed or same acceleration. Accordingly, the system as described herein is capable of manipulating the belt on the vehicle and the belt on the chute to deposit the article 106 at the destination different from the chute, with the manipulation of both belts being adjusted based on the determined one or more characteristics to adjust a deposit speed, deposit acceleration, deposit angle, deposit period and deposit movement (collectively referred to as "deposit characteristics") of at least one belt (i.e., the belt on the vehicle or the belt on the chute) to deposit the article at a destination different from chute 108. This capability can provide a further layer of handling control for a fragile or orientation-sensitive article 106**.

In one embodiment, element 104 can include two or more belts **104*a***. In one embodiment, the two or more belts are configured to move/revolve parallel to each other. In one embodiment, the two or more belts may be configured to move at an angle relative to each other.

Figures 5, 6:
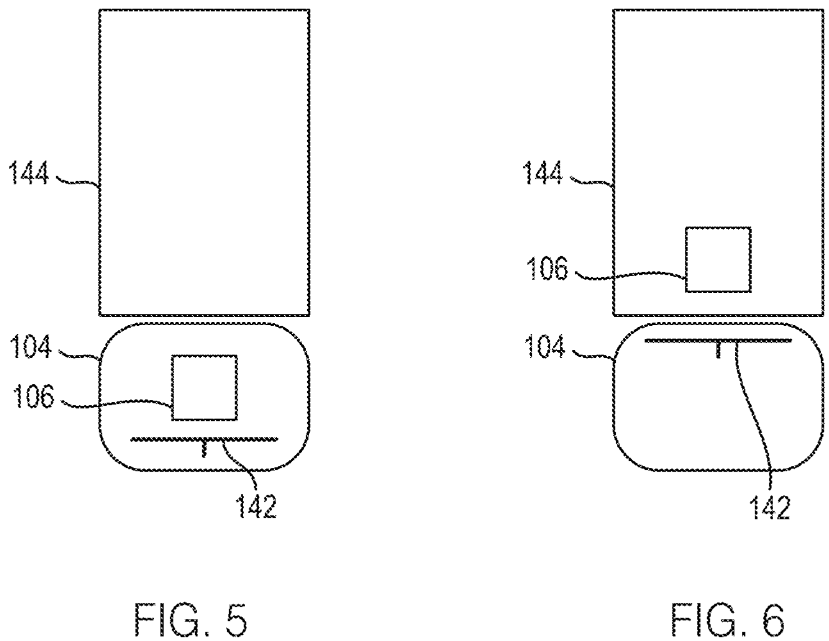
FIG. 5 is a top plan view of a computer controlled transport vehicle including a push bar or flapper carrying an article to be sorted to a destination according one or more embodiments of the presently disclosed subject matter.
FIG. 6 is a top plan view of a computer controlled transport vehicle including a push bar or flapper depositing the article to be sorted at a destination according one or more embodiments of the presently disclosed subject matter.

In a further embodiment as illustrated in FIGS. 5 and 6, element 104 of vehicle 102 can include a push bar or flapper 142 to divert article 106 from vehicle 102 to deposit the article 106 at the destination 144, the manipulation of push bar or flapper 142 along with element 104 being adjusted based on the determined one or more characteristics to adjust a deposit speed, deposit acceleration, deposit angle, deposit period and deposit movement (collectively referred to as "deposit characteristics") of the tray, belt or carrier 104 to deposit the article. In one embodiment, element 104 is in the form of a tray, with the push bar or flapper 142 operating to divert article 106 located on tray 104 to deposit the article

106 at the destination 144. In one embodiment, the tray in combination with the push bar or flapper constitutes element 104 as described herein. In one embodiment, destination 144 represents a chute, with or without a chute belt.

After obtaining information on the article, i.e., after determining a characteristic of the article, the system directs the vehicle to transport the article proximal to a receptacle or chute associated with the destination assigned for the article, and adjusts the manipulation of the tray, belt or carrier to adjust a deposit speed, a deposit acceleration, deposit angle, and a method of movement of the article for depositing the article at the destination, as applicable. In one embodiment, a storage container such as a tote can be located near the exit portion or exit side of the chute. In one embodiment, the system adjusts the manipulation of the tray, belt or carrier to adjust one or more of a deposit speed, a deposit acceleration, a deposit angle, a deposit motion, and a deposit movement sequence of the article into the receptacle or chute 108 (alternately referred to herein as "destination"), as applicable.

In operation, a controller of the control system causes computer controlled transport vehicle 102 to travel proximal to a destination such as, for example, receptacle or chute 108, and to deposit article 106 by manipulation of tray, belt or carrier 104 from a first position where the article 106 is located on tray, belt or carrier 104 (as shown in FIG. 1) to a second position where the article slides towards and deposits at the destination. As an illustrative example, FIG. 2 illustrates article 106 sliding onto chute 108. In another embodiment, the destination can be a receptacle such as a tote, carton, bag, Gaylord liner, or any type of receptacle that collects or accumulates a plurality of articles.

In one embodiment, the deposit movement sequence includes a combination of a series of minor movements configured for the safe deposition of the article, wherein the safe deposition implies minimal or no damage to the article, its contents or its packaging. In one embodiment, the deposit movement sequence can result in the article moving in a curved path as the movement speed or movement acceleration is simultaneously reduced such that the article slides into the destination, but does not tumble into the destination. In one embodiment, the deposit movement sequence can result in the article moving in a substantially linear path as the movement speed or movement acceleration is simultaneously reduced such that the article slides into the destination rather than tumbling into the destination. In a further embodiment, the deposit movement sequence can cause the article to move in a path that includes a substantially linear path portion and a substantially curved path portion as the movement speed or movement acceleration is simultaneously reduced such that the article slide into the destination rather than tumbling into the destination.

The control system comprising the controller can be embodied as a server with a processor and a memory, where the processor executes many instructions provided herein. The controller can be configured to receive an order for a plurality of disparate articles to fulfill an order. The disparate articles can represent a plurality of similar articles having different sizes, colors, and the like, or the disparate articles can be largely unrelated. The controller can be configured to determine one destination receptacle or chute 108 among a plurality of chutes or receptacles to deposit, with vehicle 102, a selected article 106. The controller can be configured to direct vehicle 102 to transport article 106 stowed about a tray, belt or carrier 104 attached to the vehicle to the receptacle or chute 108 and deposit/unload the article by manipulation of tray, belt or carrier 104 for deposit of the selected article in the destination receptacle or chute 108. The controller can be further configured to determine a characteristic of the article 106, and use this characteristic as an input in manipulating the tray, belt or carrier 104 from the first position to the second position to deposit the article into a receptacle or chute 108 or onto a receptacle or chute 108, wherein the manipulation of the tray, belt or carrier is adjusted based on the determined characteristic (such as, for example, the fragility, weight, shape, density, volume, outside packaging or other characteristic of the article) to adjust a deposit speed, deposit acceleration, angle, rate of divert, or other element or method of movement of the article into or onto the receptacle or chute.

The deposit characteristic can comprises one or more of a deposit speed, a deposit acceleration, a deposit angle, a deposit period, and a deposit movement. The deposit angle can vary between 1 degrees and 90 degrees depending on the characteristic determined for the article. The deposit speed can vary between 1 mm/second to 100 m/second, 0.2 degree/second to 2000 degrees per second, 0.1 radians/second to 1000 radians/second, or more depending on the characteristic determined for the article. The deposit period can vary from a few milliseconds to several seconds depending on the characteristic determined for the article.

The system can further include an article supply location, the article supply location including a plurality of articles. The system can include a plurality of transport vehicles 102 each comprising a tray, belt or carrier 104 having a first position in which an article is stowed about the tray, belt or carrier and a second position in which the article is deposited into a proximal receptacle or chute. In some embodiments, the system can further include an information acquisition device 132 configured to interact with an identifier associated with the article transported by the vehicle 102 from the article supply location to a location proximal the receptacle or chute 108. In one embodiment, device 132 includes an imaging device or scanner. In one embodiment, the identifier includes a scannable unique identification code such as a UPC code, for example. In other embodiments, the identifier can be a RFID tag, other type of bar code, or similar other identifier. In one embodiment, device 132 is mounted onto, and forms part of, vehicle 102. In various embodiments, device 132 may be in communication with a controller forming part of a control system, can also be in wireless connection with a server. The controller, control system or the server may identify the article based on the scanned or read identifier information received from device 132. The controller may then direct vehicle 102 to deposit article 106 at a specific destination 144 based on the identity of the article as identified by device 132.

The system can receive the article 106 from an article supply location at a warehouse, and can further direct the vehicle 102 to transport the article from an article supply location to a receptacle or chute location. In one embodiment, the system is further configured to set the predetermined angle, speed, acceleration or movement method (also referred to herein as a "deposit movement") at a first value for a first article, and adjust the predetermined angle to a second value different from the first value for a second article.

Computer controlled transport vehicle 102 can represent or can include a sorting robot, a transportation robot, a loading and unloading robot or other similar types of traveling robots. Vehicle 102, in addition to being in wireless connection with a controller forming part of a control system, can also be in wireless connection with a server. Based on instructions and signals received from the controller of the control system, vehicle 102 is capable of traveling forward or backward as well as turning on a surface to a target area associated with the destination such as receptacle or chute 108 to perform tasks such as unloading (or loading) articles.

Sorting robots such as a computer controlled transport vehicle 102 can come to a full stop at the destination (e.g., proximal the receptacle or chute 108) location prior to transferring the transported article to the destination. This stopping advantageously allows the diverting movement or method of the tray, belt or carrier that causes the transfer of the article to take any amount of time, angle, speed, acceleration, movement required to properly sort, handle, transport and transfer the article.

Various embodiments of the presently disclosed subject matter can allow for customization of an angle, speed, or acceleration associated with the tilting, turning or other method of movement of the tray, belt or carrier 104 attached to the computer controlled transport vehicle carrying the article based on a characteristic determined for the article. For example, an article such as business card may require a greater tilt angle, speed, movement or acceleration than other articles. To elaborate, a small card in cellophane package that, due to the possibility of static electricity causing the product to stick to the tray, belt or carrier, will need to be handled with a higher-than-average tilt/movement speed, angle or acceleration. The system can accordingly adjust the manipulation of the tray, belt or carrier carrying such a card based on the determination of physical characteristics of the card to ensure that the card is effectively transferred from the tray, belt or carrier onto/into the receptacle or chute. In some embodiments, a further movement is necessitated from the receptacle or chute into a final tote or container located proximal to an exit portion of the receptacle or chute.

As another example, when the characteristic of the article is such that the article is very heavy, or the article is of high density, and the packaging is likely to be damaged if the article is allowed to drop onto/into the receptacle or chute or tumble onto/into the receptacle or chute, the system can accordingly adjust the manipulation of the tray, belt or carrier based on the determination of physical characteristics of the heavy or high density article to ensure that it is effectively transferred from the tray, belt or carrier onto/into the receptacle or chute. In some embodiments, the further movement from the receptacle or chute onto/into a tote or container located proximal to an exit portion of the receptacle or chute occurs with little to no damage to its packaging due to the advantageous adjustment of the manipulation of the tray, belt, or carrier based on the determined characteristic for the article.

In a further example, when the characteristic of the article is such that the article is a high-value perfume with valuable (high cost) packaging surrounding the product, wherein the packaging and/or the perfume within could be damaged if the article is allowed to drop onto/into the receptacle or chute or tumble onto/into the receptacle or chute, the system can accordingly adjust the manipulation of the tray, belt or carrier based on determining the physical characteristic of the article to ensure that it is effectively transferred from the tray, belt or carrier onto/into the receptacle or chute, and further from the receptacle or chute onto/into a tote or container located proximal to an exit portion of the receptacle or chute with little to no damage to its contents or its high-value packaging due to the advantageous adjustment of the manipulation of the tray, belt, or carrier based on the determined characteristic for the article. As a person of skill in the art may appreciate, high-value perfumes often include a valuable (high cost) packaging surrounding the product because of its influence on consumer satisfaction.

In one embodiment, the tray, belt or carrier can carry two articles at the same time, and the system can manipulate the tray, belt or carrier from a first position to a second position to deposit the first article, and from a first position to a third position different from the second position to deposit a second article, wherein the manipulation of the tray, belt or carrier from the first position to the third position is adjusted based on a determined characteristic for the second article.

In one embodiment, the manipulation of the tray, belt or carrier from the first position to the second position causes the article to slide across a tray surface, traverse a belt, or move away from the computer controlled transport vehicle from a first position to a second position and deposit at the destination. In one embodiment, the deposit speed for an article is adjusted based on a determined characteristic of the article such that the manipulation of the tray from the first position to the second position occurs over a period of at least 2 seconds. For another article such as a flat card, the deposit speed is adjusted such that the manipulation of the tray from the first position to the second position occurs over a period of less than 0.5 seconds. In further embodiments, the timing of the sortation or divert movement from faster to slower can be accomplished by a belt movement that is faster or slower in execution. In one embodiment, this movement could be via a faster or slower movement of a diverting arm, a pushing device, or any other variable speed device to facilitate the movement of the to be sorted article 106 from a position on the tray, belt or carrier onto/into chute or receptacle 108. In some embodiments, at the time of deposition or right before the moment of deposition, the sortation or divert movement is reduced by reducing the speed of the belt movement. In one embodiment, at the time of deposition or right before the moment of deposition, the sortation or divert movement is reduced by slowing the movement of a diverting arm, a pushing device, or any other variable speed device to facilitate the movement of the to be sorted article 106 from a position on the tray, belt or carrier onto/into chute or receptacle 108.

In one embodiment, the manipulation of the tray from the first position to the second position causes the article to slide across or on the tray, belt or carrier 104 surface and then across or on at least a portion of an article traversing surface of the receptacle or chute 108. In one embodiment, the chute includes a transition portion 110 near the point where the article is deposited on or into the chute, an exit portion 114, and a central portion 112 between the transition and exit portions as shown in FIG. 1.

In one embodiment, the transition portion 112 is designed to slow a speed of slide of the article on the article-traversing surface of the receptacle or chute 108. In one embodiment, in order to slow the speed of slide of the article, the transition portion is made of plastic. In a further embodiment, the transition portion is made of HDPE plastic, vinyl, or a similar other plastic material, with the material being selected based on its coefficient of friction value. In one embodiment, a major surface of the transition portion makes an angle of less than 30 degrees with a surface traversed by the computer controlled transport vehicle. In the same embodiment, or in a different embodiment, the central portion 112 makes an angle of between 30 degrees and 0 degrees with the surface traversed by the computer controlled vehicle 102. In the same embodiment, or in a different embodiment, whereas the exit portion makes an angle of between 30 degrees and 0 degrees with the surface traversed by the computer controlled vehicle 102. In one embodiment, the exit portion 114 makes an angle of 0 degrees with the surface traversed by the computer controlled vehicle; in other words, a major surface of the exit portion on which the deposited article traverses is substantially parallel to the surface traversed by the computer controlled transport vehicle. The angles associated with the transition portion, the middle portion and the exit portion of the receptacle or chute 108 can be configured uniquely for each set of articles sharing similar or same physical characteristics.

The embodiments of the presently disclosed subject matter can thus advantageously permit an article with special handling characteristics to be diverted to a receptacle or chute that is specially designed to accommodate it. For example, to accommodate the sorting of an article with unique packaging such as a shoe box, the chute can be specially configured such that the angle of the chute is similar to the maximum angle of the tilt tray or exit position of a belt or carrier, and then the grade of the chute is varied such that the major surface of the chute is substantially horizontal at the central portion and/or at the exit portion. To accommodate the sorting of a fragile article, the chute can be configured to include a plastic transition portion which can further include an adjustable angle to accommodate various products without causing tumbling.

In one embodiment, at least a portion of the article traversing surface of the receptacle or chute 108 makes an angle of less than 45 degrees with the surface traversed by the computer controlled transport vehicle 102, this portion representing either the whole of the transition portion in some embodiments. In a further embodiment, the angle between the portion of the article traversing surface of the receptacle or chute 108 and a surface traversed by the computer controlled transport vehicle 102 is set equal to a predetermined angle associated with a predetermined characteristic of the article 106. For example, the predetermined angle can be greater than 80 degrees for a chute dedicated for receiving articles such as cards whereas the predetermined angle can be less than 30 degrees for a receptacle or chute 108 dedicated to receiving articles such as shoe boxes. In a further example, the predetermined angle is less than 45 degrees for an article with fragile contents or packaging.

In one embodiment, the manipulation can include adjusting an acceleration of a speed of the manipulation of the tray, belt or carrier from the first position to the second position to cause the article to slide across the tray surface, move with the rotation of a belt, or caused to move from the computer controlled transport vehicle 102 in some manner that facilitates the diversion of the article 106. In one embodiment, the manipulation can include adjusting a deceleration of a speed of the manipulation of the tray from the first position to the second position to cause the article to slide across the tray surface, move with the rotation of a belt, or caused to move from the computer controlled transport vehicle 102 in some manner that facilitates the diversion of the article 106. Accordingly, in some embodiments, the control system is configured to adjust an acceleration of a speed of the manipulation of the tray, belt, or carrier from the first position to the second position to cause the article to slide across a tray surface, traverse a belt, or move away from the computer controlled transport vehicle, and deposit at the destination such as a receptacle or chute. In the same embodiments or in different embodiments, the control system is also configured to adjust a deceleration of a speed of the manipulation of the tray, belt, or carrier from the first position to the second position to cause the article to slide across a tray surface, traverse a belt, or move away from the computer controlled transport vehicle, and deposit at the destination.

In one embodiment, the system is further configured to direct the computer controlled transport vehicle to come to a complete stop prior to the manipulation of the tray, belt or carrier to ensure that the deposition of the article does not result in damage to the article or its packaging. In some embodiments where the destination is a receptacle or chute, the system can be further configured to direct the computer controlled transport vehicle to come to a complete stop prior to the manipulation of the tray, belt, or carrier to facilitate a positive deposition of the article at the receptacle or chute. This ensures a positive and accurate divert of the article into the receptacle or chute. In other words, coming to a complete stop can prevent the article being inadvertently being deposited into a nearby receptacle or chute.

In one embodiment, the manipulation of the tray, belt or carrier from the first position to the second position results in an edge of the tray, belt or carrier traversing a parabolic path during the period of manipulation of the tray, belt or carrier.

In some embodiments, the vehicle comprises a tray that includes a tilting divert mechanism, wherein the system can be further configured to manipulate the tray from the first position to the second position such that an edge of the tray traverses a parabolic path during the manipulation of the tray. The system can also be configured to determine one or more tray operating parameters such as a tilt speed, a tilt angle, and an acceleration of tilt to be applied when manipulating the tray from the first position to the second position to deposit the article at the destination. In such embodiments, the one or more tray operating parameters is determined based on the one or more physical characteristics of the article. In some embodiments, the one or more physical characteristics of the article represent the characteristic determined for the article.

According to some embodiments, at an order processing facility, depending on a typical profile of orders, a single order processing facility can include multiple receptacles and/or multiple chutes leading to the multiple receptacles. For example, where the order processing facility is a grocer that may need to fill an order profile that includes breakable glass jars and crushable breads—in addition to other articles that do not have special handling requirements. In such a scenario, each of the article classes—the glass jars, the breads, and the remaining articles—can be assigned its own separate chute, each chute designed to accommodate the unique handling characteristic associated with each article class. Accordingly, in the scenario including three article classes, three separate receptacle systems and/or chute systems can be provided at each order processing facility/location. Further, at each of the order processing facility/locations, the system can then be configured to sort and transport all articles under each article class to its specially assigned chute.

The control system can further be configured for managing articles with many types of handling characteristics. An article master file can be made available to the system. In some embodiments, the article master file can be in the form of a cross-reference table listing all products/articles that a processing facility handles. The master file can include fields for article description, barcode, category, weight, dimensions, and special handling characteristics (the "characteristic" of the article), among others. The special handling characteristics field can indicate to the control system how the article needs to be handled, wherein the special handling characteristics correspond to the characteristic to be determined for the article as part of the sortation process. For example, the glass candle jar can be assigned a type 6 for handling purposes, and the sortation divert method consist of a tilting tray, wherein type 6 indicates that the tilt tray should tilt at a speed of 20 mm/s or 4 degrees/s or 0.2 to 200 radians/second, with an acceleration of 10 mm/$s^2$ or 2 degrees/$s^2$ or 0.1 to 100 radians/$s^2$, and to a maximum angle of 45 degrees; type 6 can further indicate that the article needs to be diverted to a chute that has an HDPE plastic transition portion set at 30 degrees. Similar article types can be assigned to sets of articles such as un-banded shoe boxes, light weight cellophane-wrapped cards, and heavy articles.

In one embodiment, at an order processing facility that uses a sortation divert method consisting of a tilting tray, the product master file can include independent fields for tilt speed, tilt acceleration, tilt angle and receptacle/chute type for each article. When an article is scanned at an induction location of an order processing facility, the barcode of the article can be communicated to the control system, which in turn can look up which order the article needs to be sorted to, and the special handling characteristic associated with the article. The control system can then transmit to the vehicle 102 the routing information such that the vehicle 102 can transport the associated article to the intended order location; the control system can further communicate the tilt speed, tilt acceleration and tilt angle to the vehicle 102 for application to divert the article to a destination such as a receptacle or chute. In some embodiments, the control system can advantageously be used in conjunction with cross-belt sorters or other diverting mechanisms. For example, a cross-belt can be configured to have an adjustable speed and acceleration so that special handling requirements for one or more articles or article classes/categories can be met. In some embodiments, the control system is configured to control other divert methods or movements based on the characteristic identified for a given article. The control system can further be configured to control the diverting device, wherein the diverting device can be configured to have an adjustable speed, acceleration, or similar other aspects such that the special handling requirements for a unique article can be met based on the characteristic identified for a given article.

In one embodiment, the predetermined angle is less than 45 degrees. In one embodiment, the control system is further configured to adjust an acceleration of a speed of the manipulation of the tray from the first position to the second position to cause the article to slide across a tray surface. In one embodiment, the control system is further configured to adjust a deceleration of a speed of the manipulation of the tray from the first position to the second position to cause the article to slide across a tray surface. In one embodiment, a speed of the manipulation of the tray from the first position to the second position is less than 20 mm/second or 4 degree/second. In one embodiment, an acceleration of a speed the manipulation of the tray from the first position to the second position is less than 10 mm/$second^2$ or 2 degrees/$second^2$.

In one embodiment wherein the article is a card, the predetermined angle is greater than 45 degrees. In one embodiment wherein the article is a card, the manipulation of the tray from the first position to the second position occurs over a period of less than 0.5 seconds. In one embodiment wherein the article is a card, a speed of the manipulation of the tray from the first position to the second position is greater than 20 mm/second or 4 degrees per second. In one embodiment wherein the article is a card, an acceleration of a speed of the manipulation of the tray from the first position to the second position is greater than 10 mm/$second^2$ or 2 degrees/$second^2$.

In one embodiment, to accommodate any unique characteristic of the associated article, the system can set the speed of the manipulation of the tray, belt or carrier from the first position to the second position to less than 20 mm/second for a fragile article, for example, to reduce or prevent damage to the article, or its packaging. For the same article or for a different article, the system can set the acceleration of a speed of manipulation of the tray, belt of carrier from the first position to the second position to less than 10 mm/$second^2$ to reduce or prevent damage to the article, or its packaging. For example, for an article that is not fragile, the system can set the predetermined tray movement, belt movement or carrier movement to be greater than 20 mm/second.

In one embodiment where the article is a card or a similar other thin and flat article, the manipulation of the tray, belt or carrier from the first position to the second position occurs over a period of less than 0.5 seconds; further, for a card, the speed of the manipulation of the tray, belt or carrier from the first position to the second position is set to be greater than 20 mm/second. Furthermore, for a card, the acceleration of a speed of the manipulation of the tray, belt or carrier from the first position to the second position is set to be greater than 10 mm/$second^2$. In one embodiment, the predetermined angle (i.e., deposit angle) between the first and second positions of the tray for an article is configured such that it is adequate to overcome a force of static electricity between the article and a tray surface on which the article needs to slide in order to reach its destination location.

For example, when the article needs to stay in an upright position (and not tumble) during the sorting process (e.g. when the article is a shoe box or a glass candle jar), the system can be configured to divert/deposit the article with a slower tilt, belt or other motion speed to a shallow-angle chute 108 such that the article maintains an upright position without tumbling over during the process. This can be advantageous when the article is a glass candle jar for ensuring that the lid of the glass candle jar, which is often unsecured, stays on the jar. The system can further limit the tilt angle, belt movement or other method of movement in order to prevent tumbling of the jar. In one example, while the system can maintain the tilt angle at 82 degrees for most articles being diverted/transferred to the same chute, for example, the system can adjust the tilt angle of the tray to 45 degrees for a glass candle jar being diverted to the same chute. As an additional precaution, the system can also limit the acceleration and deceleration of the tilt as the candle jar (or similar other article that could get damaged by tipping) is not be damaged by sudden movements or such that any sudden movement may not result in the tipping of the candle jar (or similar other article that could get damaged by tipping).

In one embodiment, the system manipulates the tray, belt or other device from a first position to a second position to deposit the article at the destination, wherein the manipulation of the tray, belt or other device is adjusted based on the determined characteristic to adjust a deposit speed, a deposit acceleration, a deposit angle, a deposit period, and a deposit movement or similar other deposit attribute associated with the article.

In one embodiment, while the predetermined angle between the first and second positions of the tray is less than 35 degrees for an article comprising a high-value packaging or a delicate packaging, the predetermined angle is set to be greater than 70 degrees for an article comprising non-fragile content.

In one embodiment, the chute includes a plastic transition portion, wherein the plastic transition portion slows a speed of slide of the article on the article-traversing surface of the chute. In one embodiment, a major surface of the plastic transition portion makes an angle of less than 30 degrees with a surface traversed by the computer controlled transport vehicle.

In one embodiment, the chute further includes an exit portion, wherein a major surface of the exit portion is substantially parallel to a surface traversed by the computer controlled transport vehicle.

In one embodiment, a portion of the article-traversing surface of the chute makes an angle of less than 45 degrees with a surface traversed by the computer controlled transport vehicle. In another embodiment, an angle between a portion of the article traversing surface of the chute and a surface traversed by the computer controlled transport vehicle is set equal to a predetermined angle associated with the predetermined characteristic; in one embodiment, the predetermined angle is less than 45 degrees.

In one embodiment, the manipulation of the tray from the first position to the second position causes the article to slide across a tray surface. In one embodiment, the manipulation of the tray from the first position to the second position occurs over a period of at least 2 seconds. In one embodiment, the destination is a chute, wherein the manipulation of the tray from the first position to the second position causes the article to slide on an article-traversing surface of the chute.

In one embodiment, the chute includes a plastic transition portion, wherein the plastic transition portion slows a speed of slide of the article on the article-traversing surface of the chute. In one embodiment, a major surface of the plastic transition portion makes an angle of less than 30 degrees with a surface traversed by the computer controlled transport vehicle. In one embodiment, the chute further includes an exit portion, wherein a major surface of the exit portion is substantially parallel to a surface traversed by the computer controlled transport vehicle.

In one embodiment, a portion of the article-traversing surface of the chute makes an angle of less than 45 degrees with a surface traversed by the computer controlled transport vehicle. In one embodiment, an angle between a portion of the article traversing surface of the chute and a surface traversed by the computer controlled transport vehicle is set equal to a predetermined angle associated with the predetermined characteristic.

In one embodiment, the predetermined angle is configured to overcome a force of static electricity between the article and a tray surface. In one embodiment, the predetermined angle is less than 35 degrees for an article comprising a high-value packaging or a delicate packaging. In one embodiment, the predetermined angle is greater than 70 degrees for an article comprising non-fragile content.

In one embodiment, the system further includes a scale, dimensioning device and/or a vision device which interacts with the article to measure or identify one or more physical characteristics of the article, the physical characteristics including articles such as weight, volume, height, length, breadth, width, circumference, diameter, density, a parameter related to distribution of mass within the article, and similar other articles associated with the article. In one embodiment, the scale, dimensioning device and/or a vision device can be positioned similar to information acquisition device 132 as illustrated in FIG. 1, for example. In this embodiment, the controller can be configured for communicating with the scale, dimensioning device, and/or vision device. In some embodiments, the controller can be configured to control the operations of the scale, dimensioning device, and/or vision device and further to receive information corresponding to one or more physical characteristics of the article from the scale, dimensioning device, or vision device. In some embodiments, the one or more physical characteristics of the article can be in the form of the physical characteristics master file or cross-reference table that is made available to the controller. The vision device is configured to recognize the article and categorize or determine the handling characteristics associated with the article through a vision recognition system. In one embodiment, the vision device can be a scanning device, and automated reading device, an infra-red reader, or a device using similar other technology to recognize the article and recognize or determine the handling characteristics associated with the article by communication with a vision recognition device. The vision recognition device, in turn, can be in communication with the controller.

On receiving information related to the physical characteristic of a specific article (for e.g., weight or density) from the scale, dimensioning device or vision device, for example, in the case of a tilting divert operation, the controller determines or calculates one or more operating parameters corresponding to the manipulation of the tray, belt or carrier such as a deposit speed, a deposit acceleration, a deposit angle, a deposit period, and a deposit movement, tilt speed, tilt angle, acceleration of tilt to be applied by the vehicle while manipulating the tray from the first position to the second position when handling that specific article, and similar other operating parameters. In case of a cross-belt application, the controller can determine or calculate further operating parameters such as a travel speed and an acceleration of the cross-belt when transporting that specific article on the cross-belt after the specific article reaches (or lands) on the cross-belt.

The controller can communicate the determined operating parameters to the transport vehicle such that the transport vehicle applies the determined operating parameters when manipulating the tray from a first position to a second position to deposit the specific article at the destination to thereby reduce or prevent damage to the article, or its packaging. The controller can further apply these operating parameters when operating the tray, cross-belt, or carrier as applicable, when the chute or cross-belt is transporting or handling the specific article to thereby reduce or prevent damage to the article, or its packaging. The controller can additionally apply these operating parameters when operating the chute or cross-belt, as applicable, when the chute or the cross-belt is transporting or handling the specific article to thereby reduce or prevent damage to the article, or its packaging.

According to one embodiment, the control system is configured for use with transporting an article with a computer controlled transport vehicle to a destination, the control system comprising a memory and a processor. The control system is configured to transport an article carried by the computer controlled transport vehicle to the destination, wherein a tray pivotally attached to the computer controlled transport vehicle engages the article, wherein a characteristic is determined for the article, manipulate the tray from a first position to a second position to deposit the article at the destination, wherein the manipulation of the tray is adjusted based on the determined characteristic to adjust a deposit speed of the article.

In one embodiment, the system is further configured to receive the article from an article supply location at a warehouse. In one embodiment, the system is further configured to transport the article from an article supply location to a chute location.

In one embodiment, the system is further configured to set the predetermined angle at a first value for a first article, and adjust the predetermined angle to a second value different from the first value for a second article.

In one embodiment, the system is further configured to manipulate the tray from a first position to a third position different from the second position to deposit a further article at the destination, wherein the manipulation of the tray from the first position to the third position is adjusted based on a determined characteristic for the further article.

In one embodiment, the system is further configured to determine one or more operating parameters such as a tilt speed, a tilt angle, an acceleration of tilt to be applied when manipulating the tray from the first position to the second position to deposit the article at the destination, wherein the one or more operating parameters is determined based on the one or more physical characteristics of the article.

In some embodiments, the manipulation of the tray, belt, or carrier from the first position to the second position occurs over a specific span of time. The specific span of time can be based on the characteristic determined for the article. In one example, the specific span of time may be greater for a fragile article than for a robust or non-fragile article.

In some embodiments where the destination is a chute, the manipulation of the tray, belt, or carrier from the first position to the second position causes the article to slide into or onto an article-traversing surface of the chute. As a person of skill in the relevant art understands, in some embodiments, the chutes can have angled surfaces with the angles varying a great deal based on the specific sorting operation, the specific set of articles being sorted, and so forth. Accordingly, the manipulation of the tray, belt or carrier from the first position to the second position is done such that the article is able to slide into or onto an article-traversing surface of the chute and ultimately deposit in a receptacle or similar other destination.

In some embodiments where the destination is a receptacle, the manipulation of the tray, belt, or carrier from the first position to the second position causes the article to deposit at the receptacle. The receptacle can be a tote, a carton, a bag, a Gaylord liner, or a similar other item.

In some embodiments, the deposit characteristic is the deposit angle, wherein the deposit angle is configured to overcome a force of static electricity between the article and a tray surface. Some items such as, for example, an item that has accumulated static electric charges can required a deeper deposit angle for deposition at a destination because a shallower angle may be ineffective in overcoming the force of friction caused by the static electricity.

In some embodiments, the system can be further configured to receive the article from an article supply location at a warehouse; the system can also be further configured to transport the article from an article supply location to a receptacle or chute location.

In some embodiments, the system can be further configured to set a first deposit angle for a first article, and set a second deposit angle different from the first deposit angle for a second article. In other words, the system can be configured to customize the deposit angle for each category of articles, or for each article.

In some embodiments, the system can be further configured to manipulate the tray, belt, or carrier from the first position to a third position different from the second position to deposit a second article at the destination, wherein the manipulation of the tray, belt, or carrier from the first position to the third position is adjusted based on a determined characteristic for the second article. In other words, the system can be configured to customize manipulation specifics for each category of articles, or for each article.

In some embodiments, the system can be further configured to adjust a diverting attribute of a diverting arm to deposit the article at the destination, the diverting attribute based on the characteristic determined for the article. Diverting arms can be used to move the article either on a conveyor belt or on the tray, belt, or carrier of a computer controlled transport device towards or into a destination. In some embodiments, the system may apply a specific diverting attribute for a specific article for diverting of the article by the diverting arm to deposit the article at the destination. In some embodiments, the diverting attribute comprises one or more of a diverting speed, a diverting angle, a diverting period, and a diverting movement. In some embodiments, the diverting attribute of the article or for the article is supplied by a cross-reference table such as an article master file as previously described, wherein the cross-reference table includes a list of deposit characteristics for a plurality of articles.

Accordingly, in some embodiments, a control system configured for use with transporting an article with a computer controlled transport vehicle to a destination and depositing the article at the destination with a diverting arm is provided. The control system comprises a memory and a processor. The control system can be configured to transport an article carried by the computer controlled transport vehicle to the destination, wherein a tray, belt, or carrier attached to the computer controlled transport vehicle engages the article, wherein a characteristic is determined for the article, and manipulate the diverting arm from a first position to a second position to deposit the article at the destination, wherein the manipulation of the diverting arm is adjusted based on the determined characteristic to adjust a deposit characteristic of the article. The manipulation of the diverting arm can be based on factors similar to the manipulation of the tray, belt, or carrier attached to the computer controlled transport vehicle. For example, in some embodiments, the deposit characteristic comprises one or more of a deposit speed, a deposit acceleration, a deposit angle, a deposit period, and a deposit movement.

In some embodiments, the system can be further configured to adjust a pushing attribute of a pushing device to deposit the article at the destination, the pushing attribute based on the characteristic determined for the article. Pushing devices can be used to push the article either on a conveyor belt or on the tray, belt, or carrier of a computer controlled transport device towards or into a destination. In some embodiments, the system may apply a specific pushing attribute for a specific article for pushing of the article by the pushing device to deposit the article at the destination. In some embodiments, the pushing attribute comprises one or more of a pushing speed, a pushing angle, a pushing period, and a pushing movement. In some embodiments, the pushing attribute of the article or for the article is supplied by a cross-reference table such as an article master file as previously described, wherein the cross-reference table includes a list of deposit characteristics for a plurality of articles.

Accordingly, in some embodiments, a control system configured for use with transporting an article with a computer controlled transport vehicle to a destination and depositing the article at the destination with a pushing device is provided. The control system comprises a memory and a processor. The control system can be configured to transport an article carried by the computer controlled transport vehicle to the destination, wherein a tray, belt, or carrier attached to the computer controlled transport vehicle engages the article, wherein a characteristic is determined for the article, and manipulate the pushing device from a first position to a second position to deposit the article at the destination, wherein the manipulation of the pushing device is adjusted based on the determined characteristic to adjust a deposit characteristic of the article. The manipulation of the pushing device can be based on factors similar to the manipulation of the tray, belt, or carrier attached to the computer controlled transport vehicle. For example, in some embodiments, the deposit characteristic comprises one or more of a deposit speed, a deposit acceleration, a deposit angle, a deposit period, and a deposit movement.

In some embodiments, the manipulation of the pushing device as well as the manipulation of the tray, belt, or carrier attached to the computer controlled transport vehicle can occur in the same embodiment.

In some embodiments, the manipulation of the diverting arm as well as the manipulation of the tray, belt, or carrier attached to the computer controlled transport vehicle can occur in the same embodiment. In some embodiments, the manipulation of the pushing device, the manipulation of the diverting arm, and the manipulation of the tray, belt, or carrier attached to the computer controlled transport vehicle can occur in the same embodiment.

In various embodiments, the system can apply the same or similar technics in manipulating the diverting arm from a first position to a second position to deposit the article at the destination, in manipulating the pushing device from a first position to a second position to deposit the article at the destination, and in manipulating the tray, belt, or carrier from the first position to the second position to deposit the article at the destination. Embodiments of the presently disclosed subject matter can accordingly work with trays, belts, carriers, diverting arms and pushing devices to deposit the article at the destination, wherein the manipulation is adjusted based on the determined characteristic to adjust a deposit characteristic of the article.

In some embodiments, the control system can further comprise a scale or dimensioning device configured to interact with the article to measure one or more physical characteristics of the article. In the same embodiments or in different embodiments, the belt includes a rotating belt divert mechanism, wherein the system can be further configured to determine one or more belt operating parameters such as a belt speed, a belt acceleration, and a belt rotation distance to be applied when manipulating the belt from the first position to the second position to deposit the article at the destination, wherein the one or more belt operating parameters is determined based on the one or more physical characteristics of the article.

In some embodiments, the deposit characteristic is the deposit movement, wherein the system is further configured to determine one or more deposit movement parameters such as a movement speed, a movement acceleration, and a movement distance to be applied when manipulating the device from the first position to the second position to deposit the article at the destination, wherein the one or more deposit movement parameters is determined based on the one or more physical characteristics of the article.

In some embodiments, two or more trays attached to the computer controlled transport vehicle engage the article, wherein the manipulation of a first tray is different from the manipulation of a second tray. In other words, the system can be configured to manipulate each of the trays in a manner that optimizes the deposition of the article at the destination, the optimization being based on aspects such as total time for the operation, damage prevention or minimization, positive deposition at the predetermined chute or receptacle, and similar other aspects.

In some embodiments, two or more belts attached to the computer controlled transport vehicle engage the article, wherein the manipulation of a first belt is different from the manipulation of a second belt. In other words, the system can be configured to manipulate each of the belts in a manner that optimizes the deposition of the article at the destination.

In some embodiments, two or more carriers attached to the computer controlled transport vehicle engage the article, wherein the manipulation of a first carrier is different from the manipulation of a second carrier. In other words, the system can be configured to manipulate each of the carriers in a manner that optimizes the deposition of the article at the destination.

In some embodiments, the deposit characteristic of the article is supplied by a cross-reference table such as an article master file as previously described, wherein the cross-reference table includes a list of deposit characteristics for a plurality of articles.

In some embodiments, a method for transporting an article with a computer controlled transport vehicle to a destination comprises transporting an article carried by a computer controlled transport vehicle to a destination, wherein a tray, belt, or carrier attached to the computer controlled transport vehicle engages the article, wherein a characteristic is determined for the article, and manipulating the tray, belt, or carrier from a first position to a second position to deposit the article at the destination, wherein the manipulation of the tray, belt, or carrier is adjusted based on the determined characteristic to adjust a deposit characteristic of the article.

In some embodiments, a system includes an article supply location, the article supply location including a plurality of articles. The system further includes a computer controlled transport vehicle including a tray, belt, or carrier having a first position in which an article is stowed about the tray, belt, or carrier and a second position in which the article is deposited into a proximal destination. The system also includes an information acquisition device 132 configured to interact with an identifier associated with a selected article of the article supply location. The system additionally includes a control system configured to transport an article carried by the computer controlled transport vehicle proximal to the destination, wherein the tray, belt, or carrier engages the article, wherein a characteristic is determined for the article based on the identifier, and manipulate the tray, belt, or carrier from the first position to the second position to deposit the article at the destination, wherein the manipulation of the tray, belt, or carrier is adjusted based on the determined characteristic to adjust a deposit characteristic of the article.

According to one or more embodiments the system as disclosed herein comprises: an article supply location, the article supply location including a plurality of articles; a transport vehicle comprising a tray having a first position in which an article is stowed about the tray and a second position in which the article is deposited into a proximal chute; an information acquisition device configured to interact with an identifier associated with a selected article of the article supply location; and a control system configured to: transport an article carried by a computer controlled transport vehicle to the destination, wherein a tray pivotally attached to the computer controlled transport vehicle engages the article, wherein a characteristic is determined for the article based on the identifier, manipulate the tray from the first position to the second position to deposit the article into the proximal chute, wherein the manipulation of the tray is adjusted based on the determined characteristic to adjust a deposit speed of the article.

In one embodiment, the system is further configured to direct the computer controlled transport vehicle to come to a complete stop prior to the manipulation of the tray, belt, or carrier to ensure a positive and accurate divert of the article into a specific receptacle or chute.

In one embodiment, a method for transporting an article with a computer controlled transport vehicle to a destination comprises transporting an article carried by the computer controlled transport vehicle to the destination, wherein a tray pivotally attached to the computer controlled transport vehicle engages the article, wherein a characteristic is determined for the article, and manipulating the tray from a first position to a second position to deposit the article at the destination, wherein the manipulation of the tray is adjusted based on the determined characteristic to adjust a deposit speed of the article.

In one embodiment, the system can be configured in the case of a physical movement of a device that is a part of the computer controlled transport vehicle to determine one or more operating parameters such as a movement speed, movement acceleration, movement distance or other factors to be applied when manipulating the device from the first position to the second position to deposit the article at the destination, wherein the one or more operating parameters is determined based on a physical characteristic of the article.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

These and other changes can be made to the disclosure in light of the Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

What is claimed is:

1. A control system configured for use with transporting an article with a computer controlled transport vehicle to a destination, the control system comprising a memory and a processor, wherein the processor is configured to:

control transport of the article carried by the computer controlled transport vehicle to the destination, wherein a tray, belt, or carrier attached to the computer controlled transport vehicle engages the article; and manipulate the tray, belt, or carrier from a first position to a second position to deposit the article at the destination, wherein the manipulation is adjusted based on a characteristic determined for the article to adjust a deposit period for the article, wherein the manipulation occurs over a specific span of time based on the characteristic.

2. The control system of claim 1, wherein the characteristic comprises one or more of: a deposit acceleration, a deposit angle, a deposit period, and a deposit movement.

3. The control system of claim 1, wherein the control system is further configured to adjust a diverting attribute of a diverting arm to deposit the article at the destination, the diverting attribute based on the characteristic determined for the article.

4. The control system of claim 1, wherein the control system is further configured to adjust a pushing attribute of a pushing device to deposit the article at the destination, the pushing attribute based on the characteristic determined for the article.

5. The control system of claim 1, wherein the characteristic determined for the article is one of: acquired by the control system, and provided to the control system.

6. The control system of claim 1, wherein the destination is a receptacle, wherein the manipulation of the tray, belt, or carrier from the first position to the second position causes the article to deposit at the receptacle.

7. The control system of claim 6, wherein the receptacle is one of a: tote, carton, bag, and Gaylord liner.

8. The control system of claim 1, wherein the control system is further configured to: adjust a deceleration of a speed of the manipulation of the tray, belt, or carrier from the first position to the second position to cause the article to slide across a tray surface, traverse a belt, or move away from the computer controlled transport vehicle, and deposit at the destination.

9. The control system of claim 1, wherein the control system is further configured to: adjust an acceleration of a speed of the manipulation of the tray, belt, or carrier from the first position to the second position to cause the article to slide across a tray surface, traverse a belt, or move away from the computer controlled transport vehicle, and deposit at the destination.

10. The control system of claim 1, wherein the control system is further configured to: set a first deposit angle for a first article, and set a second deposit angle different from the first deposit angle for a second article.

11. The control system of claim 1, wherein the tray, belt or carrier carries two articles at a same time, wherein the control system is further configured to: set a first deposit angle for a first article, and set a second deposit angle different from the first deposit angle for a second article.

12. The control system of claim 1, wherein the control system is further configured to maintain a sortation criteria of the article to thereby maintain a predetermined orientation of the article.

13. The control system of claim 1, wherein the control system is further configured to eliminate a chance of the article being mis-diverted to a wrong destination.

14. The control system of claim 1, wherein the computer controlled transport vehicle comprises a push bar for diverting the article.

15. A control system configured for use with transporting an article with a computer controlled transport vehicle to a destination, the control system comprising a memory and a processor, wherein the processor is configured to:

control transport of the article carried by the computer controlled transport vehicle to the destination, wherein a tray, belt, or carrier attached to the computer controlled transport vehicle engages the article; and manipulate the tray, belt, or carrier from a first position to a second position to deposit the article at the destination, wherein the manipulation is adjusted to adjust a deposit period for the article, wherein the destination comprises a chute with a powered chute belt, wherein the control system is further configured to coordinate a speed or acceleration of the belt attached to the computer controlled transport vehicle to match the speed or acceleration of the powered chute belt.

16. A control system configured for use with transporting an article with a computer controlled transport vehicle to a destination, the control system comprising a memory and a processor, wherein the processor is configured to:

control transport of the article carried by the computer controlled transport vehicle to the destination, wherein a tray, belt, or carrier attached to the computer controlled transport vehicle engages the article; and manipulate the tray, belt, or carrier from a first position to a second position to deposit the article at the destination, wherein the manipulation is adjusted based on a characteristic determined for the article to adjust a deposit characteristic of the article, wherein the manipulation occurs over a specific span of time based on the characteristic, wherein the destination is one of: a tote, a carton, a bag and a Gaylord liner.

17. A control system configured for use with transporting an article with a computer controlled transport vehicle to a destination, the control system comprising a memory and a processor, wherein the processor is configured to:

control transport of the article carried by the computer controlled transport vehicle to the destination, wherein a tray attached to the computer controlled transport vehicle engages the article, wherein the tray comprises a tilting divert mechanism; and manipulate the tray from a first position to a second position to deposit the article at the destination, wherein the manipulation is adjusted based on a characteristic determined for the article, wherein the manipulation occurs over a specific span of time based on the characteristic.

18. A control system configured for use with transporting an article with a computer controlled transport vehicle to a destination, the control system comprising a memory and a processor, wherein the processor is configured to:

control transport of the article carried by the computer controlled transport vehicle to the destination, wherein a tray, belt, or carrier attached to the computer controlled transport vehicle engages the article; and manipulate the tray, belt, or carrier from a first position to a second position to deposit the article at the destination, wherein the manipulation occurs over a specific span of time based on a characteristic determined for the article.

* * * * *